(12) United States Patent
Miyamoto

(10) Patent No.: US 8,983,122 B2
(45) Date of Patent: Mar. 17, 2015

(54) IMAGE PROCESSING APPARATUS, IMAGE PROCESSING METHOD, AND COMPUTER-READABLE STORAGE MEDIUM

(75) Inventor: Hideaki Miyamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 13/411,445

(22) Filed: Mar. 2, 2012

(65) Prior Publication Data

US 2012/0230541 A1  Sep. 13, 2012

(30) Foreign Application Priority Data

Mar. 9, 2011 (JP) .................. 2011-051693

(51) Int. Cl.
*G06K 9/00* (2006.01)
*G06T 5/00* (2006.01)

(52) U.S. Cl.
CPC ....... *G06T 5/007* (2013.01); *G06T 2207/10116* (2013.01); *G06T 2207/20004* (2013.01); *G06T 2207/20021* (2013.01); *G06T 5/002* (2013.01)
USPC .......................................... 382/103

(58) Field of Classification Search
CPC ........... G06T 2207/10116; G06T 2207/20004; G06T 2207/20021; G06T 5/002; G06T 5/007
USPC .......................................... 382/103
See application file for complete search history.

(56) References Cited

U.S. PATENT DOCUMENTS

| 5,651,042 A | 7/1997 | Dewaele | |
| 7,567,709 B2 * | 7/2009 | Lim et al. | 382/176 |
| 7,636,496 B2 * | 12/2009 | Duan et al. | 382/274 |
| 2002/0031246 A1 | 3/2002 | Kawano | |
| 2002/0031247 A1 | 3/2002 | Matsuura et al. | |
| 2010/0329533 A1 | 12/2010 | Omi | |

FOREIGN PATENT DOCUMENTS

| CN | 101023449 A | 8/2007 |
| CN | 101137011 A | 3/2008 |
| CN | 101351149 A | 1/2009 |
| CN | 101930595 A | 12/2010 |
| EP | 1840823 A1 | 10/2007 |
| JP | 61068031 A | 4/1986 |
| JP | 08299315 A | 11/1996 |
| JP | 2002092588 A | 3/2002 |
| JP | 2004-159087 A | 6/2004 |
| JP | 2004-166007 A | 6/2004 |

(Continued)

OTHER PUBLICATIONS

Ji et al.,"Adaptive Image Contrast Enhancement Based on Human Visual Properties", IEEE Transactions on Medical Imaging, Dec. 1994, pp. 573-586, vol. 13, No. 4.

*Primary Examiner* — Tom Y Lu
(74) *Attorney, Agent, or Firm* — Canon U.S.A. Inc. IP Division

(57) ABSTRACT

An image processing apparatus includes a first acquisition unit configured to obtain identification information for a plurality of blocks of an image, a second acquisition unit configured to obtain information to be used for image processing from a pixel value of a region of the image determined based on the identification information, and an image processing unit configured to perform image processing of the image based on the information obtained by the second acquisition unit.

25 Claims, 7 Drawing Sheets

(56) References Cited

FOREIGN PATENT DOCUMENTS

| | | |
|---|---|---|
| JP | 2005-039802 A | 2/2005 |
| JP | 2006087934 A | 4/2006 |
| JP | 2006-155572 A | 6/2006 |
| JP | 2007-104706 A | 4/2007 |
| JP | 2008-263288 A | 10/2008 |
| JP | 2009-140513 A | 6/2009 |
| JP | 2011-003201 A | 1/2011 |
| JP | 2011005050 A | 1/2011 |

* cited by examiner

IMAGE PROCESSING APPARATUS, IMAGE PROCESSING METHOD, AND COMPUTER-READABLE STORAGE MEDIUM

BACKGROUND OF THE INVENTION

1. Field of the Invention

The present invention relates to image processing of an image obtained by radiographic imaging. More particularly, the present invention relates to a technique useful for determining a processing method of image processing.

2. Description of the Related Art

According to the advance of digital technology, two-dimensional X-ray sensors (e.g., flat panel detector (FPD)) which can output X-ray images as digital data are widely used these days. X-ray imaging for medical care is generally used in the fields of medical care diagnosis. Thus, the demand for digital image processing appropriate for diagnosis is increasing.

Japanese Patent Application Laid-Open No. 61-68031 discusses a method for applying a predetermined image processing algorithm to image processing by inputting an imaging portion of a subject or information of the imaging method. According to this method, digital image processing appropriate for diagnosis can be performed for the images based on the input information.

Further, the demand for a technique that can realize general image processing without inputting image processing parameters for each image is also increasing.

Japanese Patent Application Laid-Open No. 2006-087934 discusses a method for removing portions not necessary for the diagnosis from the image by the image analysis is performed. The unnecessary portions are, for example, regions other than the irradiation field region necessary for the diagnosis and the portions where the sensor is directly irradiated by the X-ray. The remaining portions are subjected to the histogram analysis and image processing parameters are obtained.

When imaging of an X-ray moving image is performed, the imaging range is continuously changed. Thus, narrowing of X-rays by a collimator, presence/absence of the region directly exposed to the X-ray, shapes and positional relation of characteristic structures of the body (e.g., lung field, bone region), and the size of the characteristic structures in the image are continuously changed. Since images of a great variety are taken, it is convenient if general-purpose image processing can be used for the processing of the images.

Further, since it is necessary to reduce the amount of emission of the X-rays, an image of desirable quality cannot always be obtained. Thus, importance of image processing such as gradation processing, dynamic range compression processing, noise reduction processing, and edge enhancement processing is increasing.

However, since the information needs to be input for each image, according to the input method of information regarding an imaging portion and imaging method discussed in Japanese Patent Application Laid-Open No. 61-68031, the method cannot be generally applied to various images.

Further, according to the method discussed in Japanese Patent Application Laid-Open No. 2006-087934, extraction of regions other than the irradiation field and the regions directly irradiated by X-ray according to identification processing can be performed only to a portion of an image whose parameters are determined. Thus, not all images can be processed according to the method.

SUMMARY OF THE INVENTION

The present invention is directed to a structure that can stably set a processing method of image processing regardless of image diversity.

According to an aspect of the present invention, an image processing apparatus includes a first acquisition unit configured to obtain identification information for a plurality of blocks of an image, a second acquisition unit configured to obtain information to be used for image processing from a pixel value of a region of the image determined based on the identification information, and an image processing unit configured to perform image processing of the image based on the information obtained by the second acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
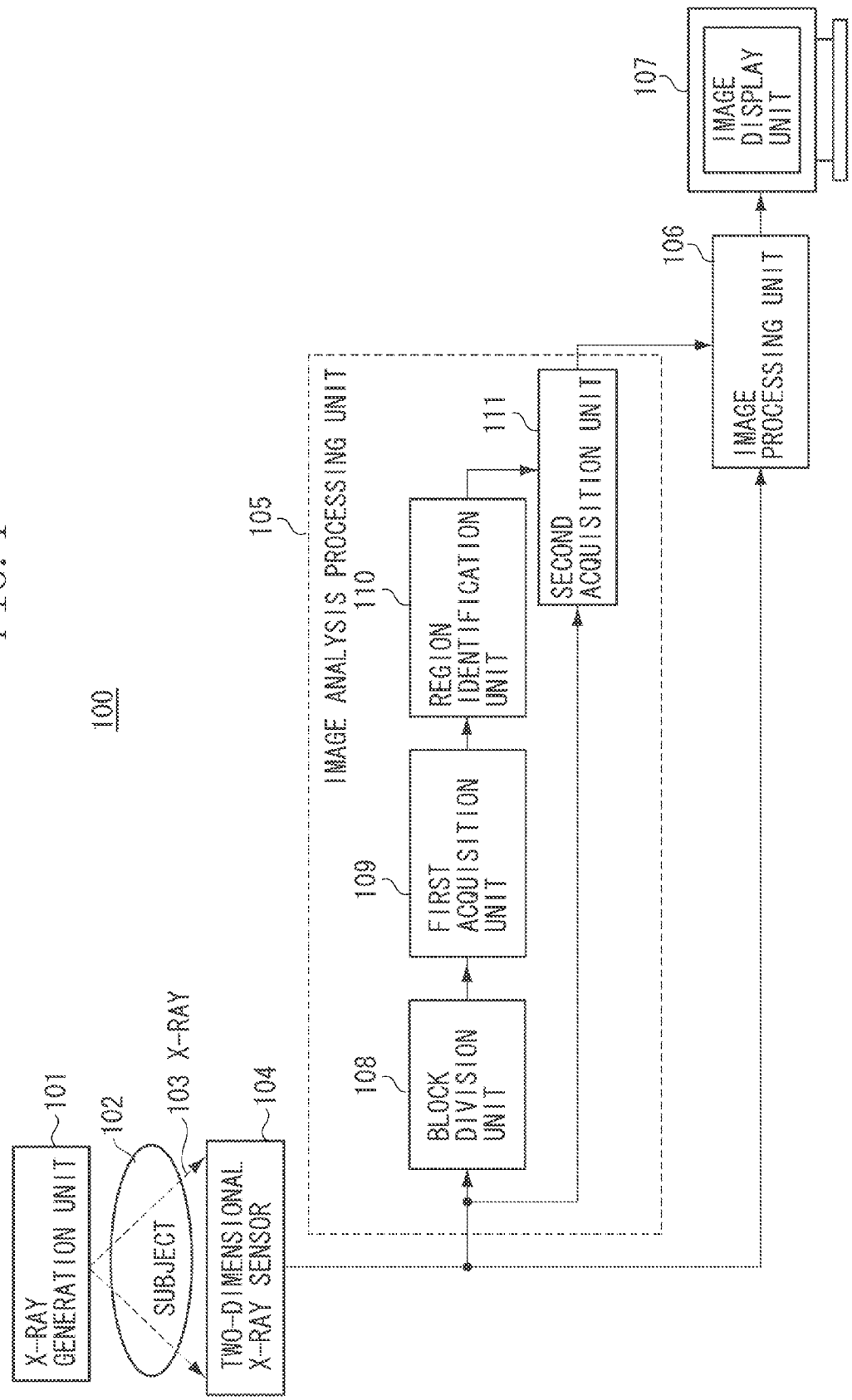
FIG. 1 illustrates a configuration of an X-ray image processing system according to a first exemplary embodiment of the present invention.

Various exemplary embodiments, features, and aspects of the invention will be described in detail below with reference to the drawings.

An X-ray image processing system according to a first exemplary embodiment of the present invention will be described with reference to FIG. 1.

An X-ray image processing system 100 includes an X-ray generation unit 101 and a two-dimensional X-ray sensor 104. The X-ray generation unit 101 can generate 3 to 30 X-ray pulses per second. The two-dimensional X-ray sensor 104 receives an X-ray 103 that passed through a subject 102 and performs imaging of an X-ray moving image, which is in synchronization with the X-ray pulse. According to the exemplary embodiments described below, the X-ray generation unit 101 can continuously emit X-rays so that imaging of 3 to 30 images per second can be acquired by the two-dimensional X-ray sensor 104.

Further, the X-ray image processing system 100 includes an image analysis processing unit 105 and an image processing unit 106. The image analysis processing unit 105 analyzes each frame of the moving image output by the two-dimensional X-ray sensor 104 and outputs an image analysis value. The image processing unit 106 performs image processing of each frame of the moving image based on the image analysis value.

Further, the X-ray image processing system 100 includes an image display unit 107 that displays a moving image that has undergone the image processing.

The configuration of the image analysis processing unit 105 is the most characteristic configuration of the present exemplary embodiment, and is described in detail below.

The image analysis processing unit 105 includes a block division unit 108 and a first acquisition unit 109. The block division unit 108 divides each frame of the moving image into blocks. Each block includes a predetermined number of pixels. The first acquisition unit 109 calculates identification information for each block or acquires an identification information calculation result from an external apparatus. The exemplary embodiments below describe a case where the identification information is calculated by the first acquisition unit 109.

The image analysis processing unit 105 further includes a region identification unit 110 and a second acquisition unit 111. The region identification unit 110 extracts a block that satisfies a predetermined identification condition. The second acquisition unit 111 acquires information necessary for the image processing based on the pixels in the block extracted by the region identification unit 110. Information output by the second acquisition unit 111 is hereinafter called an image analysis value of the image analysis processing unit 105.

Figure 2:
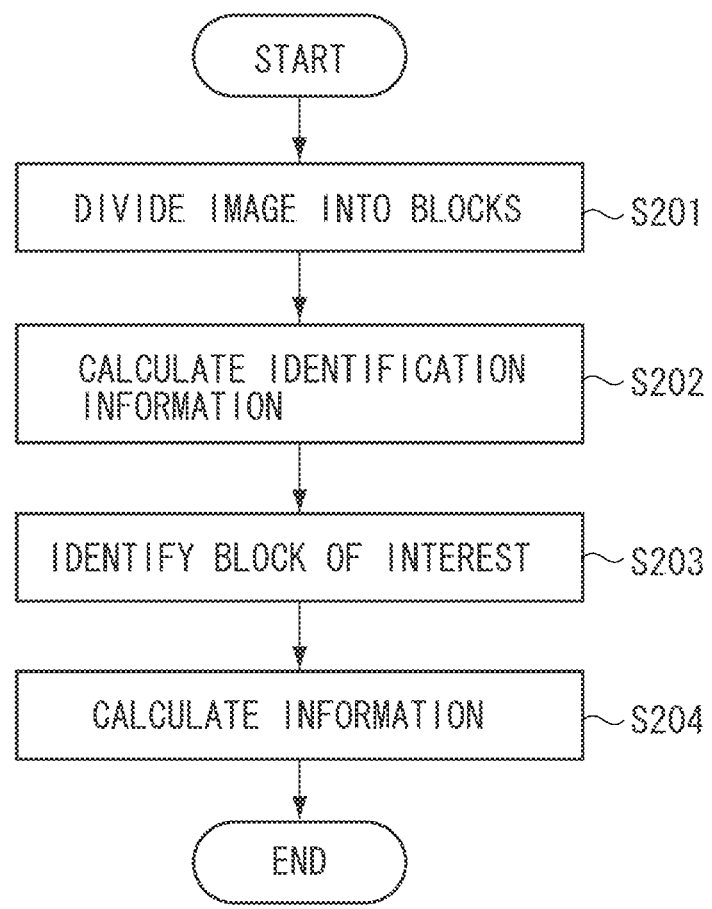
FIG. 2 is a flowchart illustrating processing flow of an image analysis processing unit according to the first exemplary embodiment.

An operation of the image analysis processing unit 105 having the above-described configuration will now be described with reference to the flowchart illustrated in FIG. 2. In the description below, each frame of the moving image output from the two-dimensional X-ray sensor 104 is an image composed of 512×512 pixels to simplify the description. Further, regarding the image analysis processing performed by the image analysis processing unit 105, two pixel values (large and small) are output from this image as information necessary for the image processing.

Further, by converting the pixel value range presented by the extracted two pixel values (large and small) into a predetermined pixel value range, gradation processing that enhances contrast is performed by the image processing unit 106.

In step S201, the image analysis processing unit 105 inputs each frame of the moving image output from the two-dimensional X-ray sensor 104 in the block division unit 108. The block division unit 108 divides the 512×512 pixel image into, for example, 64×64 blocks and outputs the obtained blocks. Each block is composed of, for example, 8×8 pixels.

In step S202, the image analysis processing unit 105 inputs the block, which has been output from the block division unit 108, in the first acquisition unit 109. The first acquisition unit 109 calculates the variation of the values of the pixels in the block as identification information from the pixels in the block. Although there can be various values that can represent the variation of the pixels in the block, a variance value Var is used in the following equation according to the present embodiment.

$$\text{Var} = \sum_{l=0}^{L-1} (l - \text{Mean})^2 P(l)$$

In the equation described above, L denotes a maximum possible pixel value of the input image, P(1) denotes a value acquired by dividing a number of pixels in a block whose number of pixels is 1 by a total number of pixels in the block and normalizing the value. Mean denotes a mean value of the pixels in the block. This identification information calculation processing is performed for all the blocks that have been input in the first acquisition unit 109. Thus, according to the processing of the present embodiment, 64×64 number of variance values Var corresponding to 64×64 blocks are output as identification information.

In step S203, the image analysis processing unit 105 inputs the identification information output from the first acquisition unit 109 in the region identification unit 110. The region identification unit 110 determines whether the variation of the pixels in the block presented by the identification information satisfies a predetermined identification condition, and outputs a block that corresponds to the identification information that satisfies the identification condition as a block of interest.

If the variance value Var is used as the identification information, whether a block (Blk) (x, y) at a position (x, y) is the block of interest can be determined, for example, by using the identification condition in the equation below where Var(x, y) is a corresponding variance value of the block Blk (x, y).

$$Blk(x, y) = \begin{cases} \text{blocks of interest } (\text{Var}(x, y) \geq T_{var}) \\ \text{other blocks } (\text{Var}(x, y) < T_{var}) \end{cases} \quad (2)$$

In the equation above, $T_{var}$ is a threshold value used for the identification of the block of interest from other blocks. An empirically-obtained value is used for $T_{var}$. According to this example, a block whose variance value as the statistic is in a predetermined range is determined as the block of interest.

In step S204, the image analysis processing unit 105 inputs the block of interest output by the region identification unit 110 and each frame of the moving image output by the two-dimensional X-ray sensor 104 in the second acquisition unit 111. The second acquisition unit 111 calculates a minimum and a maximum values from the pixels in the block of interest out of the pixels of each frame of the moving image, and outputs the values as information necessary for the image processing.

The minimum and the maximum values are the values that represent the distribution of the pixel values of the block of interest. Further, they are the image analysis values output by the image analysis processing unit 105. The image processing unit 106 enhances the contrast of each frame of the moving image which has been input by converting the range of the pixel values presented by the two pixel values into a predetermined pixel value range and outputs the result. The image processing unit 106 performs the gradation processing of the image based on the distribution information of the pixel values.

According to the present exemplary embodiment, an image is divided into blocks and a block of interest is identified based on a regional variation of the pixel values in a block. Then, two pixel values (large and small) are calculated from the pixels of the identified block of interest. The obtained pixel vales are determined as the image analysis values. These image analysis values are used as the two pixel values (large and small) necessary for the gradation processing that enhances the contrast of each frame of the moving image.

According to the configuration of the present exemplary embodiment, information necessary for the image processing is obtained based on statistical information such as variance value of a local region. Thus, semantic information of the image such as the subject type or positional relation extracted from each frame of the moving image is not used. Accordingly, it is not necessary to recognize/understand the semantic information of the image such as the subject type or positional relation. Thus, general image processing independent of the presence/absence of the collimator and the portions directly irradiated by the X-ray, and the imaging portion of the subject can be realized.

Although the image analysis processing unit 105 directly inputs each frame of the moving image output by the two-dimensional X-ray sensor 104 in the block division unit 108 in step S201 according to the description above, image reduction processing can be performed prior to the input of the image.

For example, if a mean value of neighboring 2×2 pixels of each frame of a moving image is set as a value of 1 pixel, the size of the image can be reduced to half. If the image reduction processing is performed so that the necessary amount of information for the image analysis processing is maintained, noise reduction due to the use of a mean value as the pixel value as well as improvement of the processing speed according to the reduction of the number of pixels to be processed can be realized.

Further, in step S201, the block division unit 108 may divide the image into blocks so that a pixel in a certain block does not belong to another block. The block division unit 108 may also divide the image into blocks so that neighboring blocks overlap each other and a pixel at the overlapping portion belongs to a plurality of blocks.

For example, if an image has an edge between blocks, edge information will be lost if the blocks do not overlap. On the other hand, if the blocks overlap, the edge information can be obtained and stored.

Further, although the variance value Var is used as the identification information in the description above, the statistic value that indicates the variation in the block is not limited to the variance value. For example, energy Egy and entropy Epy in the following equation can be used.

$$Egy = \sum_{l=0}^{L-1} (P(l))^2 \quad (3)$$

$$Epy = -\sum_{l=0}^{L-1} p(l) \log P(l)$$

The statistic values that indicate the texture property of the image can be used considering the amount of calculation and ease of definition of the identification condition used in step S203.

Further, in the description above, although the first acquisition unit 109 calculates the feature quantity that indicates the variation of the pixels in a block as identification information in step S202, a plurality of feature quantities may also be calculated.

For example, the statistic value that indicates the presence of the edge portion is calculated from the pixels in the block, and the obtained statistic is added to the identification information. Further, in step S203, a condition that excludes a block that includes a strong edge and an edge pointing a particular direction from the block of interest is added to the identification condition.

Evaluation values used for evaluating the presence of an edge portion are a mean value or a peak value of gradient intensity mag(i, j) and gradient direction e(i, j) which are calculated from the difference between the maximum and the minimum values of the pixels in a block and a result (fy(i, j), $$mag(i, j) = \sqrt{fx(i, j)^2 + fy(i, j)^2}$$

$$\theta = \tan^{-1} \frac{fy(i, j)}{fx(i, j)}$$

fx(i, j)) obtained by applying a differential filter in lengthwise/widthwise directions of a pixel (i, j) in a block according to the following equation.

According to the configuration described above, a block of interest can be identified considering the edge information in step S203.

Since a block of interest can be identified considering the edge information, an edge of a portion of a light-receiving face of the two-dimensional X-ray sensor 104 directly exposed to the X-ray can be excluded from the block of interest. Further, a region including an artifact such as a metal can be excluded from the block of interest.

Further, statistic value based on pixels of a block such as a minimum value, maximum value, mean value, median value, and peak value can be calculated and added to the identification information. If such values are added to the identification information, for example, a condition that excludes a block, whose statistic value is too high or too low with respect to the pixel value, from the block of interest is added to the identification condition in step S203.

According to this configuration, a block of interest can be identified considering the pixel value in step S203. In this manner, the portions directly irradiated by the X-ray and the regions other than the irradiation field can be removed from the image.

Further, the position information of the block can be included in the identification information. In step S203, for example, a condition that weighs the center of an image rather than its sides can be added to the identification condition. According to this configuration, generally, the portion of interest of the subject will be set at the center position of the image when the X-ray imaging is performed.

Further, the sides of the irradiation field will not be set at the center of the image. In this manner, information necessary for stable image processing can be obtained in a simple manner.

According to the description above, the image processing performed by the image processing unit 106 is gradation processing and the image analysis processing unit 105 obtains image analysis values necessary for the gradation processing.

However, the image processing of the present invention is not limited to gradation processing. For example, an image processing selecting unit 115 (not illustrated) can select anyone or more operations from the gradation processing, dynamic range compression processing, noise reduction processing, and edge enhancement processing. Then, identification information corresponding to the selected image processing is obtained.

According to the noise reduction processing, information of a region where the amount of X-ray emission is small is important. Thus, the pixel value is added to the identification information, and a low pixel value area with a small amount of X-ray emission is determined according to the signal-to-noise ratio of the sensor as the region of interest. In this manner, noise reduction processing that matches the noise characteristics can be performed.

The second acquisition unit 111 acquires the number of times isolated shade and shadow of the block of interest appears as a noise evaluation value and the image processing unit 106 determines, for example, a size of a smoothing filter based on the evaluation value. The identification information and the identification condition of the noise reduction processing are different from the identification information and the identification condition of the gradation data conversion processing.

Further, according to the edge enhancement processing, it is important not to enhance the region where the emission amount of X-ray is small. Additionally, information of a high pixel value region such as a lung field is also important.

For example, a high pixel value region that satisfies the condition of the equation (2) above is selected as the block of interest. This is because information can be selected from the subject region after excluding the portions directly irradiated by the X-ray region with small dispersion.

For example, the second acquisition unit 111 acquires a frequency band to be enhanced from a spacial frequency of the image of the block of interest as an analysis value, and the image processing unit 106 determines the size of an enhancing filter based on the analysis value. The identification information and the identification condition of the edge enhancement processing are different from the identification information and the identification condition of the gradation data conversion processing and the noise reduction processing.

According to the dynamic range compression processing, the minimum and the maximum values are obtained from a pixel in the block of interest as the image analysis values as are obtained in the gradation data conversion processing, and the dynamic range compression processing is performed based on the image analysis values.

Further, the second acquisition unit 111 acquires the band for frequency processing used for the dynamic range compression processing from the pixel in the block of interest as the analysis value, and the image processing unit 106 determines the size of the processing filter based on the analysis value.

In this case, two regions of interest are generated and information necessary for the image processing is acquired from each region.

As described above, the identification information and the identification condition of the dynamic range compression processing are different from the identification information and the identification condition of the gradation data conversion processing, the noise reduction processing, and the edge enhancement processing.

The edge enhancement processing and the dynamic range compression processing are frequency processing. Thus, the size of the block is desirably larger than that of the block which is used when the gradation data conversion processing or the noise reduction processing is selected.

Further, the image processing performed by the image processing unit 106 may be all or a combination of the above-described gradation processing, the dynamic range compression processing, the noise reduction processing, and the edge enhancement processing. If all or a combination of the above-described processing is to be performed, the image processing analysis unit 105 calculates a plurality pieces of the identification information, a plurality of the blocks of interest, information necessary for a plurality pieces of image processing so that all the image analysis values necessary for the image processing to be performed by the image processing unit 106 can be calculated.

Further, the image processing performed by the image processing unit 106 may be selected from an operator console (not illustrated) provided in the X-ray image processing system 100. If image processing is selected from the operator console, the image processing analysis unit 105 obtains the necessary identification information, the block of interest, the information necessary for the image processing according to the selected image processing, and obtains the image analysis value.

Further, the first acquisition unit 109 and the region identification unit 110 are independent processing with respect to blocks. Thus, if a parallel processing unit such as a graphics processing unit (GPU) is used, processing after the block division can be executed in parallel. Thus, processing speed can be furthermore enhanced.

The X-ray image processing system according to a second exemplary embodiment of the present invention will now be described with reference to FIG. 3.

The X-ray image processing system according to the second exemplary embodiment is useful when a parallel processing unit such as a GPU is used. Similar to the X-ray image processing system 100, the X-ray image processing system 300 also includes the X-ray generation unit 101 and the two-dimensional X-ray sensor 104. The X-ray generation unit 101 can generate 3 to 30 X-ray pulses per second and the two-dimensional X-ray sensor 104 receives the X-ray 103 that has passed through the subject 102 and performs imaging of a moving image as an X-ray image in synchronization with the X-ray pulse.

Further, the X-ray image processing system 300 includes an image analysis processing unit 301 and the image processing unit 106. The image analysis processing unit 301 analyzes each frame of the moving image output from the two-dimensional X-ray sensor 104, and outputs an image analysis value. The image processing unit 106 performs image processing of each frame of the moving image based on the image analysis value.

Figure 3:
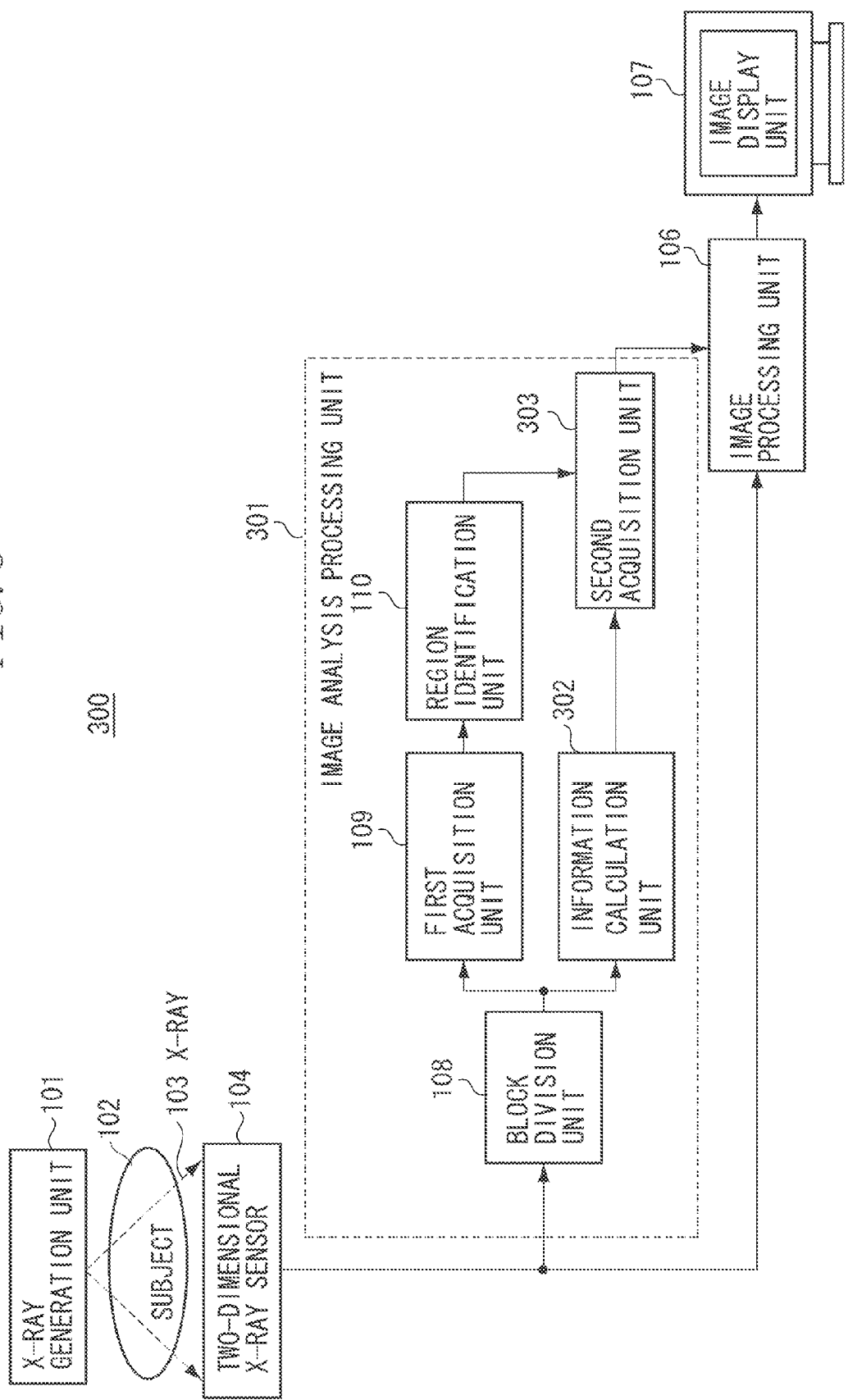
FIG. 3 illustrates a configuration of an X-ray image processing system according to a second exemplary embodiment of the present invention.

The image analysis processing unit 301 in FIG. 3 includes, as is the case with the first exemplary embodiment, the block division unit 108 that divides each frame of a moving image into blocks of a predetermined number of pixels. The image analysis processing unit 301 includes the first acquisition unit 109 that calculates identification information for each divided block, and the region identification unit 110 that extracts the block that satisfies a predetermined identification condition.

Further, the image analysis processing unit 301 includes an information calculation unit 302 that calculates information necessary for image processing of each block output from the block division unit 108. Further, the image analysis processing unit 301 includes a second acquisition unit 303. The second acquisition unit 303 acquires information necessary for the image processing from the information output from the information calculation unit 302. This information output from the information calculation unit 302 corresponds to the block of interest identified by the region identification unit 110.

Figure 4:
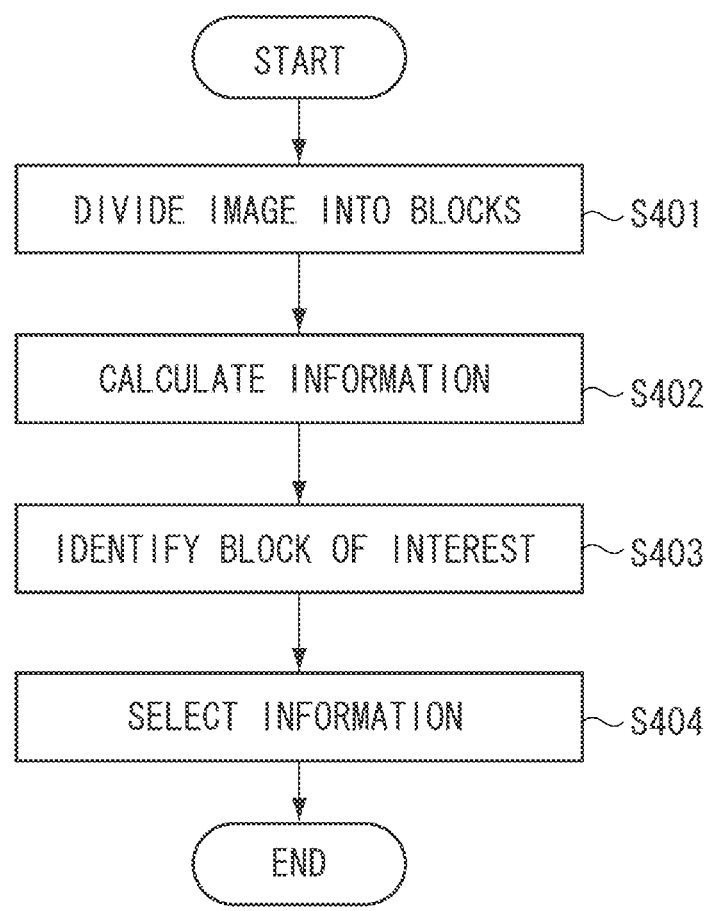
FIG. 4 is a flowchart illustrating processing flow of an image analysis processing unit according to the second exemplary embodiment.

The operation of the image analysis processing unit 301 having the above-described configuration will now be described with reference to a flowchart illustrated in FIG. 4. In the description below, each frame of the moving image output from the two-dimensional X-ray sensor 104 is an image composed of 512×512 pixels to simply the description as is described with the first exemplary embodiment. Further, the image analysis processing performed by the image analysis processing unit 105 is extraction processing of two pixel values (large and small) from the image as feature quantities.

Further, by converting the pixel value range presented by the extracted two pixel values (large and small) into a predetermined pixel value range, gradation processing that enhances contrast is performed by the image processing unit 106.

Step S401 is similar to step S201 in the first exemplary embodiment. In other words, the image analysis processing unit 301 inputs each frame of the moving image output from the two-dimensional X-ray sensor 104 in the block division unit 108, and the block division unit 108 outputs the divided blocks.

In step S402, the image analysis processing unit 301 inputs the block output from the block division unit 108 in the first acquisition unit 109 and the information calculation unit 302. As is the case with the first exemplary embodiment, the first acquisition unit 109 calculates the feature quantities indicating the variation of the pixel values of the pixels in the block as identification information.

On the other hand, the information calculation unit 302 calculates a mean value of the pixels in the block. The calculation processing is applied to all the blocks that are input. In other words, according to the assumption of the processing of the present embodiment, identification information 64×64 and information 64×64 corresponding to the 64×64 blocks is output.

Step S403 is similar to step S203 in the first exemplary embodiment. In other words, the image analysis processing unit 301 inputs the identification information output by the first acquisition unit 109 in the region identification unit 110, and the region identification unit 110 outputs a block that satisfies the identification condition as the block of interest.

In step S404, the image analysis processing unit 301 inputs the information output by the information calculation unit 302 and the block of interest output from the region identification unit 110 in a second acquisition unit 303. The second acquisition unit 303 selects a minimum and a maximum values from the mean value of the block of interest out of the mean values for each block, and outputs the values as image analysis values of the image analysis processing unit 301.

The image processing unit 106 enhances the contrast of each frame of the input moving image by converting the range of the pixel values represented by the minimum and the maximum values (i.e., the image analysis values) into a predetermined pixel value range.

According to the processing above, the first acquisition unit 109, the information calculation unit 302, and the region identification unit 110 are preferably realized by a parallel processing unit such as a GPU.

According to the present exemplary embodiment, an image is divided into blocks, and a local variation of the pixel values of the pixels in a block and a mean value of the pixels in the block are obtained. Then, a block of interest is identified based on the local variation of the pixel values. Further, the minimum and the maximum values of the pixel mean values of the pixels in the block of interest obtained in advance are selected as image analysis values and used for the gradation processing.

According to this configuration, in step S402, in addition to the identification information, information necessary for the image processing is calculated in advance by using a parallel calculation processing unit. Accordingly, in step S404, the processing can be performed by simply selecting an image analysis value from the data which has been reduced from 512×512 pixels to 64×64 blocks.

This selection can be performed at a speed higher than the speed when the information necessary for the image processing is calculated from the pixels of the block of interest in step S204 in the first exemplary embodiment.

Thus, according to the configuration of the second exemplary embodiment, in addition to the effects similar to those of the first exemplary embodiment, high-speed processing using the advantages of the parallel processing unit can be realized.

Further, according to the second exemplary embodiment, as is the case with the first exemplary embodiment, the image reduction processing may be performed before step S401.

Further, according to the second exemplary embodiment, as is the case with the first exemplary embodiment, the image may be divided so that the neighboring blocks overlap regarding the block division in step S401.

Identification information similar to the information used in the first exemplary embodiment can be used for the second exemplary embodiment. Further, a plurality of feature quantities can be used.

Image processing performed by the image processing unit 106 of the second exemplary embodiment is not limited to the gradation processing as is not limited in the first exemplary embodiment. The image processing is also applicable to the dynamic range compression processing, the noise reduction processing, and the edge enhancement processing.

Further, according to the second exemplary embodiment, as is the case with the first exemplary embodiment, the image processing performed by the image processing unit 106 can be selected from an operator console (not illustrated) provided in the X-ray image processing system 300. The image analysis value output from the image analysis processing unit 301 may be changed based on the selected image processing.

According to the configurations described above, the effects similar to those described in the first exemplary embodiment can be obtained according to the second exemplary embodiment.

The X-ray image processing system according to a third exemplary embodiment of the present invention will now be described with reference to FIG. 5. An X-ray image processing system 500 includes the X-ray generation unit 101 and the two-dimensional X-ray sensor 104. The X-ray generation unit 101 can generate 3 to 30 X-ray pulses per second. The two-dimensional X-ray sensor 104 receives the X-ray 103 that has passed through the subject 102, and performs imaging of a moving image as an X-ray image in synchronization with the X-ray pulse.

Further, the X-ray image processing system 500 includes an image analysis processing unit 501 and an image processing unit 106. The image analysis processing unit 501 analyzes each frame of the moving image output from the two-dimensional X-ray sensor 104, and outputs an image analysis value. The image processing unit 106 performs image processing of each frame of the moving image based on the image analysis value.

Figure 5:
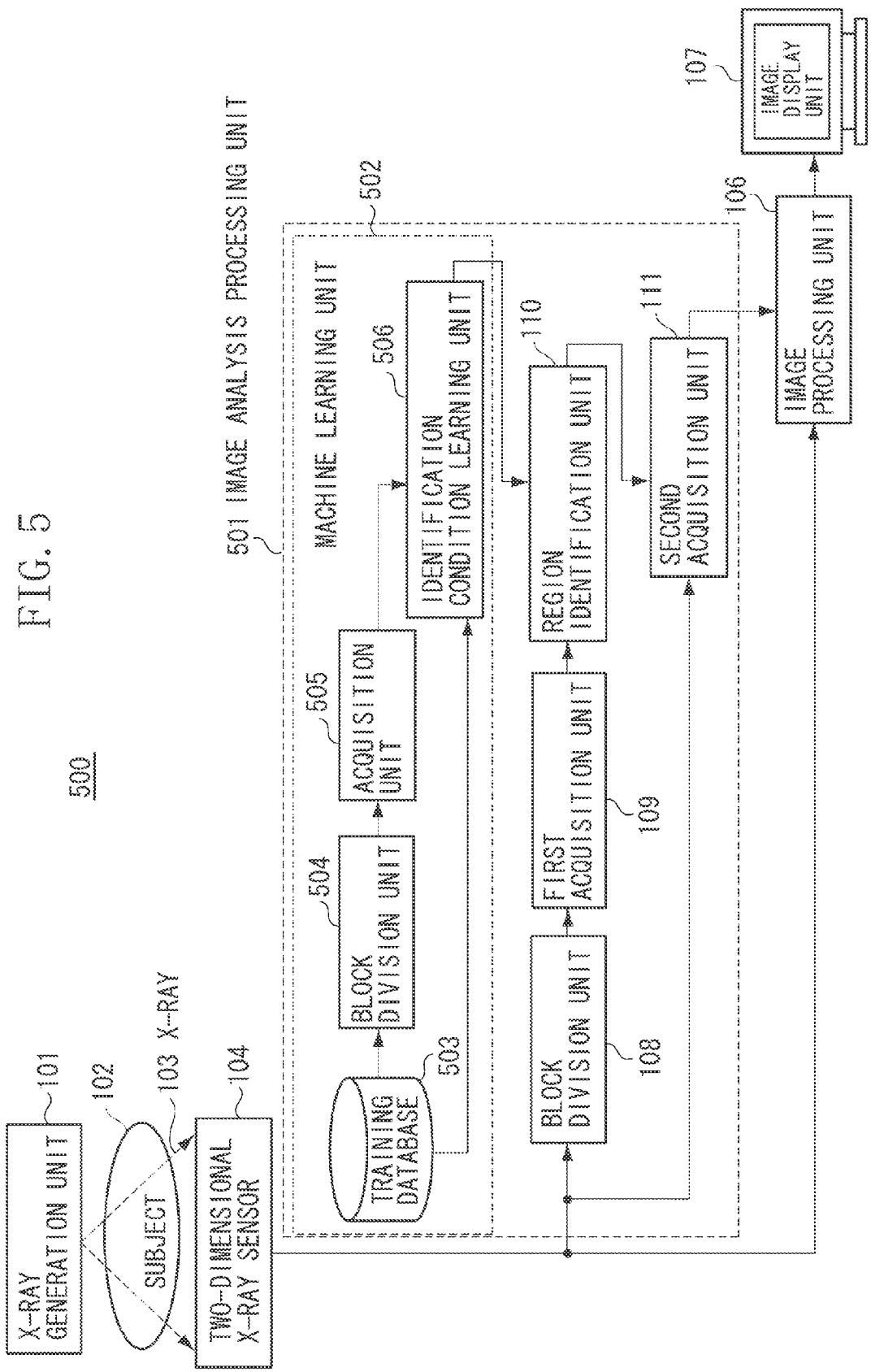
FIG. 5 illustrates a configuration of an X-ray image processing system according to a third exemplary embodiment of the present invention.

As is the case with the first exemplary embodiment, the image analysis processing unit 501 in FIG. 5 includes the block division unit 108, the first acquisition unit 109, and the region identification unit 110. The block division unit 108 divides each frame of the moving image into blocks. Each block includes a predetermined number of pixels. The first acquisition unit 109 calculates identification information for each block. The region identification unit 110 extracts a block that satisfies a predetermined identification condition in the identification information.

Further, the image analysis processing unit 501 also includes the second acquisition unit 111. The second acquisition unit 111 acquires information necessary for the image processing based on the pixels of the block of interest. The image analysis processing unit 501 outputs the value output from the second acquisition unit 111 as an image analysis value.

The image analysis processing unit 501 in FIG. 5 includes a machine learning unit 502 in addition to the configurations of the image analysis processing unit 105 in the first exemplary embodiment.

The machine learning unit 502 includes a training database 503 that stores a great amount of sample image data and training data. The sample image data is image data acquired in the past. The training data is data acquired by combining a block of interest corresponding to the sample image data and data of the block of interest obtained, for example, by manual input in advance.

Further, the machine learning unit 502 includes a block division unit 504 and an acquisition unit 505. The block division unit 504 is similar to the image processing unit 105 and calculates identification information by dividing the sample image data stored in the training database 503 into blocks.

Further, the machine learning unit 502 includes an identification condition learning unit 506 that learns the identification condition used by the region identification unit 110. The identification condition learning unit 506 learns the identification condition based on the identification information calculated from the sample image data and the data of the block of interest stored in the training database 503.

Figure 6:
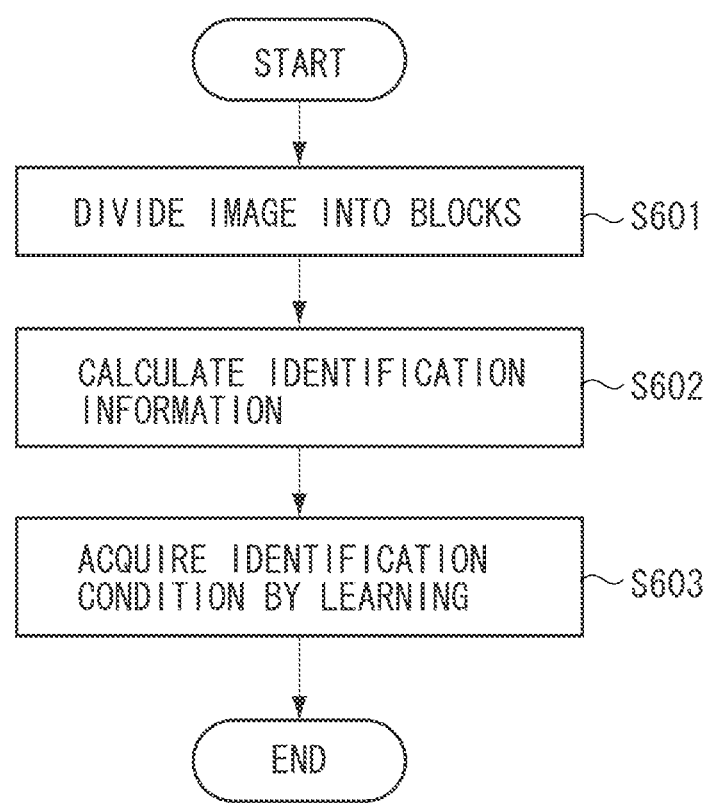
FIG. 6 is a flowchart illustrating processing flow of an image analysis processing unit according to the third exemplary embodiment.

The image analysis processing unit 501 having the above-described configuration has a learning flow for learning the identification condition by using the training data in addition to the image processing flow for performing image analysis processing and the image processing on the moving image similar to the first exemplary embodiment. Since the image processing flow is similar to the processing described above according to the first exemplary embodiment, the description is not repeated. The operation of the learning flow is described with reference to the flowchart in FIG. 6.

In step S601, the image analysis processing unit 501 reads out a sample image from the training database 503 and inputs the image in the block division unit 504. The block division unit 504 performs the block division processing that is similar to the image processing flow on the sample image and outputs the obtained result.

In step S602, the image analysis processing unit 501 inputs the block output from the block division unit 504 in the acquisition unit 505. The acquisition unit 505 performs the identification information calculation processing, similar to the above-described image processing, on each block, and calculates the identification information for each block.

In step S603, the image analysis processing unit 501 inputs the identification information output from the acquisition unit 505 and the data of the block of interest stored in the training database 503 in the identification condition learning unit 506.

The identification condition learning unit 506 acquires the identification condition based on the identification information obtained from the sample image and the data of the corresponding block of interest. The learning can be desirably performed by machine learning processing performed, for example, by a support vector machine (SVM).

The identification condition obtained by the learning flow is used for the block of interest identification in the image processing flow.

The configurations of the X-ray image processing system 500 of the third exemplary embodiment is similar to those of the X-ray image processing system 100 in the first exemplary embodiment but further includes the machine learning unit 502. However, the image processing system 300 of the second exemplary embodiment may be configured to have the machine learning unit 502.

According to the present exemplary embodiment, the identification condition used by the region identification unit 110 can be learned by machine learning from the training data including the sample image data prepared in advance and the data of the block of interest corresponding to the sample image data.

In this manner, for example, the threshold value used in the threshold value processing in the equation (2) according to the first exemplary embodiment can be efficiently obtained from the training data. Further, identification conditions applicable to various images can be learned since a great amount of training data is used.

Further, since data can be added to the training data, the identification condition can be easily improved.

Although the units illustrated in FIGS. 1, 3, and 5 are dedicated hardware, the hardware functions of the systems can be realized by software. If the units are realized by software, the functions of the units illustrated in FIGS. 1, 3, and 5 are realized by installing software in an information processing apparatus and realizing the image processing method by the execution of the software using the calculation function of the information processing apparatus.

By executing the software, for example, an image analysis process and an image processing process of each frame of the moving image output from the two-dimensional X-ray sensor 104 are executed.

Figure 7:
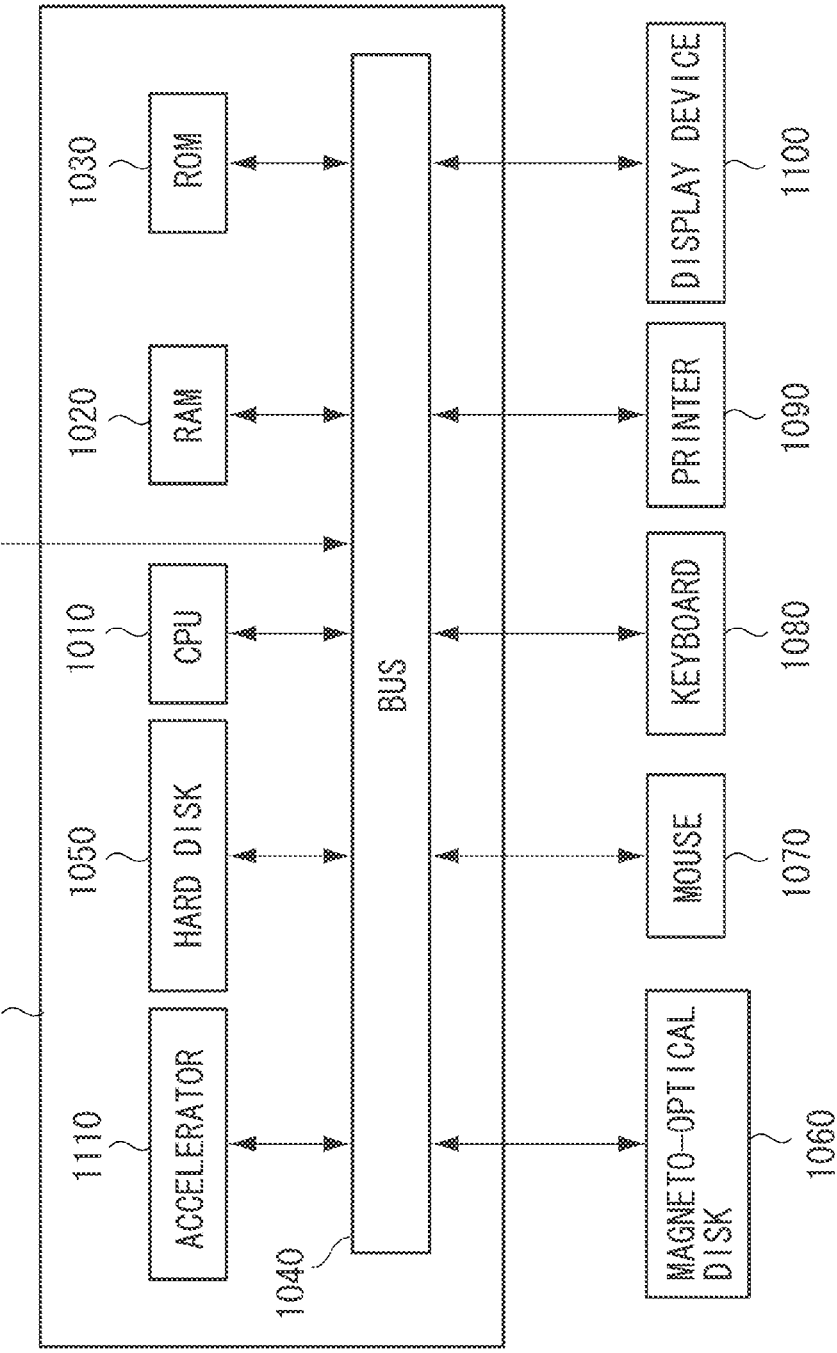
FIG. 7 illustrates an example of a computer system that can realize the present invention.

FIG. 7 is a block diagram illustrating the hardware configuration of the information processing apparatus and peripheral apparatuses. An information processing apparatus 1000 is connected to an imaging apparatus 2000 in such a manner that they can communicate with each other.

<Information Processing Apparatus>

A central processing unit (CPU) 1010 performs overall control of the information processing apparatus 1000 by using a program and data stored in a random access memory (RAM) 1020 or a read-only memory (ROM) 1030. The CPU 1010 can execute calculation processing regarding the image processing determined in advance by executing a program.

The RAM 1020 includes an area for temporarily storing a program or data loaded from a magneto-optical disk 1060 or a hard disk 1050. The RAM 1020 further includes an area for temporarily storing X-ray fluoroscopic moving image data acquired from the imaging apparatus 2000. Furthermore, the RAM 1020 includes a work area to be used by the CPU 1010 when the CPU executes various types of processing. The ROM 1030 stores setting data and boot program of the information processing apparatus 1000.

The operating system (OS), the program, and data used for causing the CPU 1010 included in a computer to execute each processing performed by each unit illustrated in FIGS. 1 to 6 are stored in the hard disk 1050. The programs and data are loaded to the RAM 1020 according to the control of the CPU 1010 and processed by the CPU 1010 (computer). Further, X-ray fluoroscopic moving image data can be stored in the hard disk 1050.

The magneto-optical disk 1060 is an example of an information storage medium. A part or all of the programs and data stored in the hard disk 1050 can be stored in the magneto-optical disk 1060.

A mouse 1070 and a keyboard 1080 are used when an operator of the information processing apparatus 1000 inputs various instructions for the CPU 1010. A printer 1090 can print an image displayed on the image display unit 107 on a recording medium.

A display device 1100 includes a cathode ray tube (CRT) display or a liquid crystal screen. The display device 1100 can display the result of the processing performed by the CPU 1010 using an image or a character. For example, the image can be displayed, which is output from the image display unit 107 after processed by each unit illustrated in FIGS. 1, 3, and 5. In this case, the image display unit 107 functions as a display control unit that displays the image on the display device 1100. The units of the information processing apparatus 1000 are connected to one another by a bus 1040. Thus, data can be transmitted and received between the units.

<Imaging Apparatus 2000>

Next, the imaging apparatus 2000 will be described. The imaging apparatus 2000 can perform imaging of a moving image and is an apparatus such as an X-ray fluoroscopic apparatus. The obtained image data is transmitted to the information processing apparatus 1000. Data of a plurality of images can be collectively sent to the information processing apparatus 1000. Data can also be sent each time the imaging is performed.

As described above, according to the present invention, a system that can perform general image processing on highly-diverse images is provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-051693 filed Mar. 9, 2011, which is hereby incorporated by reference herein in its entirety.

What is claimed is:

1. An image processing apparatus comprising:
  a first acquisition unit configured to calculate a variation of a pixel value in a block among a plurality of blocks of an image and obtain identification information based on the variation,
  a second acquisition unit configured to calculate a minimum value and a maximum value from a pixel value of a region of the image determined based on the identification information and obtain information to be used for image processing, and
  an image processing unit configured to perform image processing which enhances a contrast of the image by converting a range of the minimum value and maximum value into a predetermined pixel value range based on the information obtained by the second acquisition unit.

2. The image processing apparatus according to claim 1, wherein the region acquired by the second acquisition unit is acquired from a predetermined center portion of the image.

3. The image processing apparatus according to claim 1, wherein the identification information includes an evaluation value used for evaluating existence of an edge portion in the block, and a predetermined edge portion is excluded from a region to be acquired by the second acquisition unit.

4. The image processing apparatus according to claim 1, further comprising a selecting unit configured to select image processing to be processed by the image processing unit, and according to the image processing selected by the selecting unit, either the identification information or an identification condition of the second acquisition unit is changed.

5. The image processing apparatus according to claim 4, wherein a size of the block is changed according to the image processing selected by the selecting unit.

6. The image processing apparatus according to claim 1, wherein the image processing unit performs at least one of gradation processing, dynamic range compression processing, noise reduction processing, and edge enhancement processing.

7. The image processing apparatus according to claim 1,
  wherein the identification information includes a statistics value indicating variation of the pixel values of the block, and
  wherein the second acquisition unit identifies the block whose statistics value is in a predetermined range of a block as the region.

8. The image processing apparatus according to claim 1,
  wherein the second acquisition unit acquires distribution information of the pixel values of the region, and
  wherein the image processing unit performs at least either a gradation processing or a dynamic range compression processing for the image based on the distribution information of the pixel values.

9. The image processing apparatus according to claim 1,
  wherein the second acquisition unit acquires a noise evaluation value from the pixel in the region; and
  wherein the image processing unit performs noise reduction processing of the image based on the evaluation value.

10. The image processing apparatus according to claim 1, wherein the identification information includes a statistics values indicating texture property of the image.

11. The image processing apparatus according to claim 1, wherein the identification information includes at least one of a mean value, a maximum value, a minimum value, a median value, and a peak value obtained from the pixel value of the block.

12. The image processing apparatus according to claim 9, wherein the noise evaluation value includes a variance value, a difference value between a maximum value and a minimum value obtained from the pixel values of the block.

13. The image processing apparatus according to claim 1, wherein the first acquisition unit performs division between adjacent blocks so that the blocks overlap.

14. The image processing apparatus according to claim 1, wherein the image processing unit further includes an image reduction unit configured to reduces a size of the image in advance to a predetermined size.

15. The image processing apparatus according to claim 1, wherein the second acquisition unit further includes an identification condition learning unit configured to learn identification information to be used for the block of interest by using a plurality of sample images and data of a block of interest obtained in advance and corresponding to the sample image.

16. An image processing method comprising:
  acquiring identification information to calculate a variation of a pixel value in a block among a plurality of blocks of an image and obtaining identification information based on the variation,
  calculating a minimum value and a maximum value from a pixel value of a region of the image determined based on the identification information to acquire information necessary for image processing, and
  performing image processing which enhances a contrast of the image by converting a range of the minimum value and the maximum value into a predetermined pixel value range based on the obtained information.

17. A non-transitory computer-readable storage medium storing a program for causing a computer to execute the image processing method according to claim 16.

18. An image processing apparatus comprising:
a first acquisition unit configured to obtain identification information for a plurality of blocks of an image;
a second acquisition unit configured to obtain information to be used for image processing from a pixel value of a region of the image determined based on the identification information, and
an image processing unit configured to perform image processing of the image based on the information obtained by the second acquisition unit,
wherein the second acquisition unit acquires distribution information of the pixel values of the region, and
wherein the image processing unit performs at least either a gradation processing or a dynamic range compression processing for the image based on the distribution information of the pixel values.

19. An image processing method comprising:
acquiring identification information for a plurality of blocks of an image,
acquiring information necessary for image processing based on a pixel value of a region of the image determined based on the identification information, and
performing image processing of the image based on the obtained information,
wherein the acquiring includes acquiring distribution information of the pixel values of the region, and
wherein the image processing includes performing at least either a gradation processing or a dynamic range compression processing for the image based on the distribution information of the pixel values.

20. A non-transitory computer-readable storage medium storing a program for causing a computer to execute the image processing method according to claim 19.

21. The image processing apparatus according to claim 18, wherein the identification information includes an evaluation value used for evaluating existence of an edge portion in the block.

22. The image processing apparatus according to claim 18, wherein the identification information includes a statistics value indicating variation of the pixel values of the block.

23. The image processing apparatus according to claim 18, wherein the identification information includes a statistics values indicating texture property of the image.

24. The image processing apparatus according to claim 18, wherein the identification information includes at least one of a mean value, a maximum value, a minimum value, a median value, and a peak value obtained from the pixel value of the block.

25. The image processing apparatus according to claim 18, wherein the identification information includes a variation of a pixel value in a block among a plurality of blocks of an image.

* * * * *